United States Patent [19]

Anscher et al.

[11] Patent Number: 4,878,269

[45] Date of Patent: Nov. 7, 1989

[54] CORD FASTENER

[75] Inventors: Joseph A. Anscher, Huntington Bay, N.Y.; James Dillner, Lancaster, Pa.

[73] Assignee: National Molding Corp., Farmingdale, N.Y.

[21] Appl. No.: 218,501

[22] Filed: Jul. 1, 1988

Related U.S. Application Data

[63] Continuation of Ser. No. 905,831, Sep. 10, 1986, abandoned.

[51] Int. Cl.⁴ .............................................. F16G 11/00
[52] U.S. Cl. ............................... 24/115 G; 24/136 R; 24/712.5
[58] Field of Search ................ 403/374, 211; 439/817, 439/818; 24/136 R, 136 L, 115 G, 115 H, 115 M, 117, 30.5 R, 136 A; 267/165

[56] References Cited

U.S. PATENT DOCUMENTS

| 2,200,895 | 5/1940 | Rio ........................................ 24/117 |
| 2,855,632 | 10/1958 | Croce et al. ................... 267/165 X |
| 3,132,390 | 5/1964 | Boden .............................. 24/117 X |
| 3,140,365 | 7/1964 | Voland ........................... 267/165 X |
| 4,288,891 | 9/1981 | Boden .............................. 24/115 G |

FOREIGN PATENT DOCUMENTS

| 891065 | 9/1953 | Fed. Rep. of Germany ........ 24/117 |
| 1276059 | 10/1961 | France ................................. 24/115 G |
| 46651 | 2/1919 | Sweden ............................... 403/211 |
| 365977 | 1/1932 | United Kingdom ............... 403/211 |
| 2131868 | 6/1984 | United Kingdom ............. 24/115 G |

Primary Examiner—James R. Brittain
Attorney, Agent, or Firm—Kenyon & Kenyon

[57] ABSTRACT

A fastener for releasably clamping cords which includes a housing having a cavity therein and a movable element disposed in said cavity defining one or two cord passages and further including a spring attached to the housing so that the passage is restricted by the movable element.

20 Claims, 4 Drawing Sheets

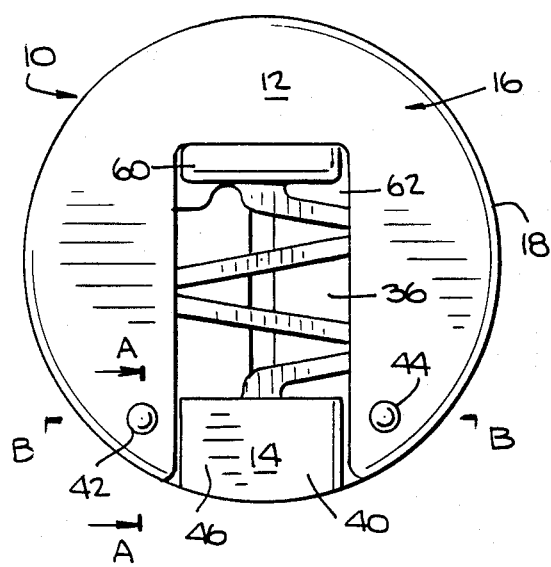
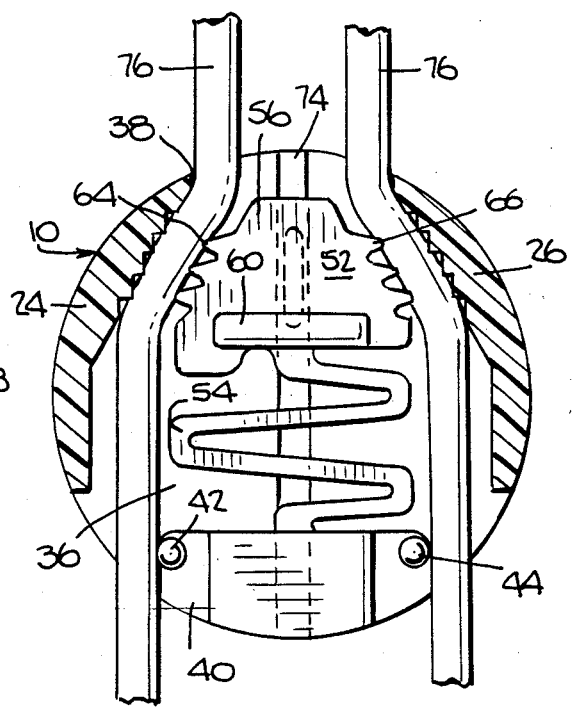
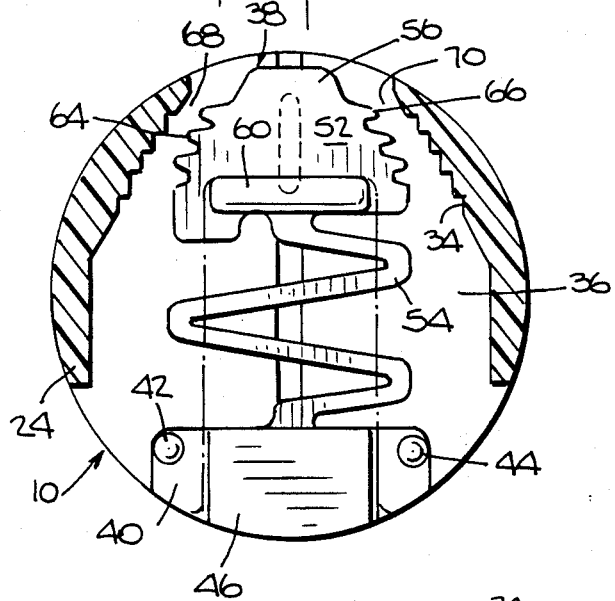
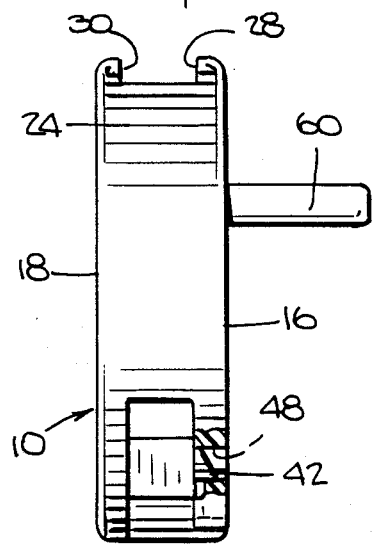
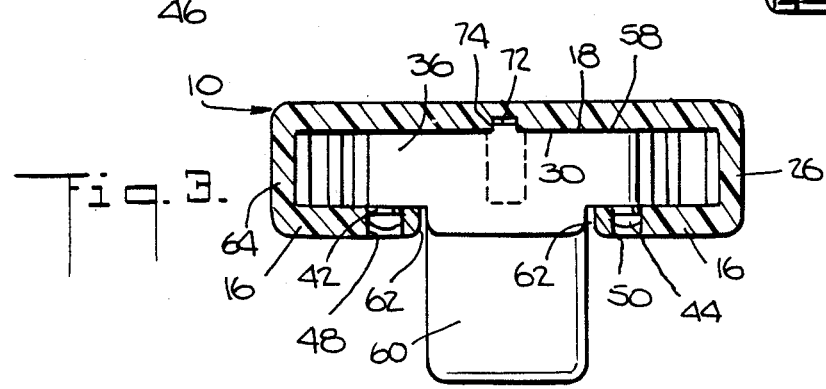

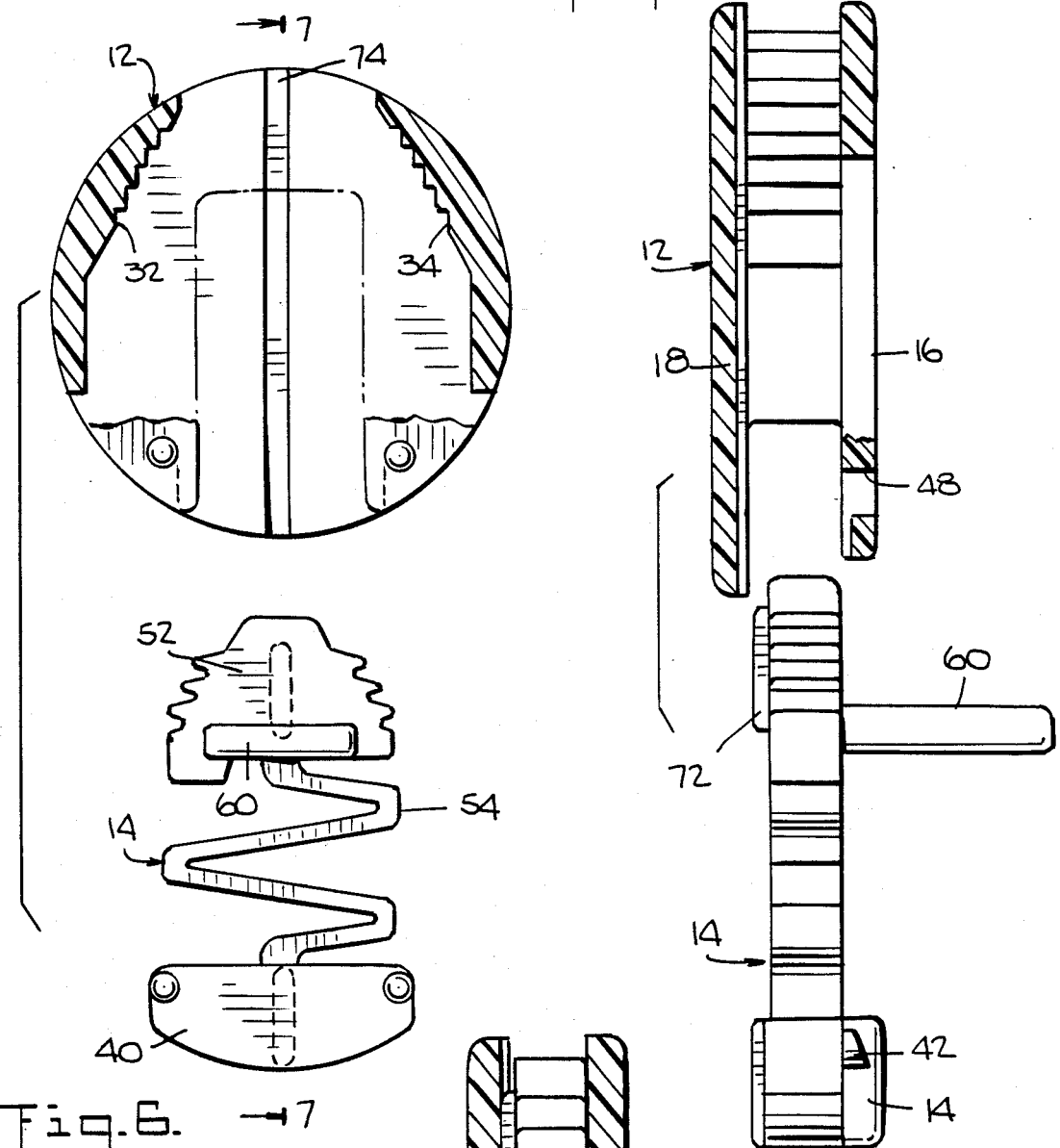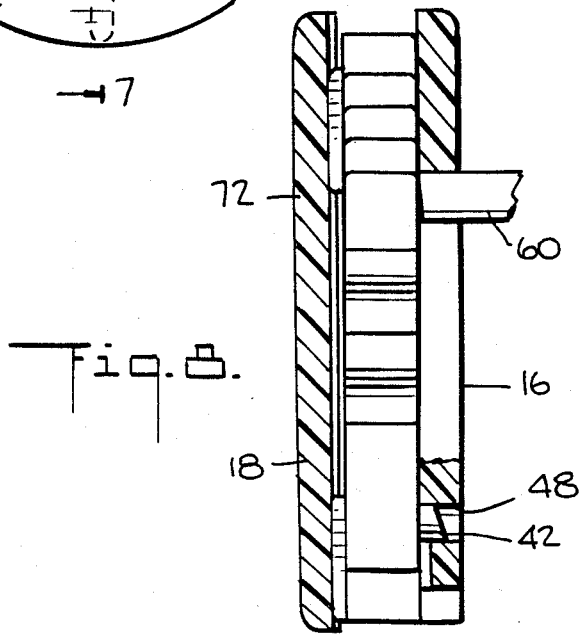

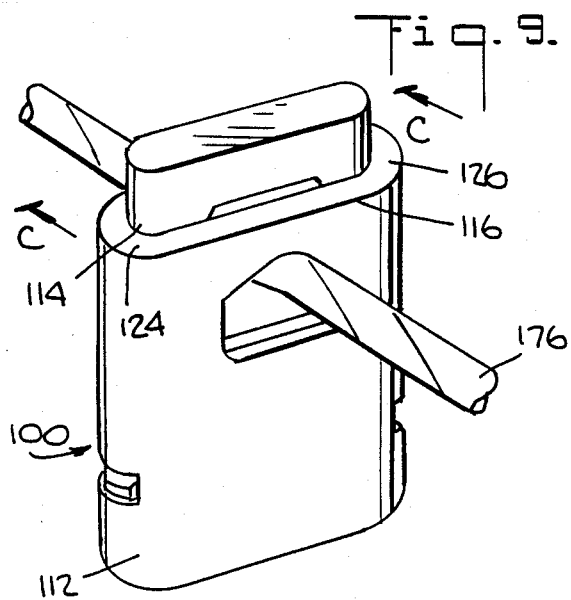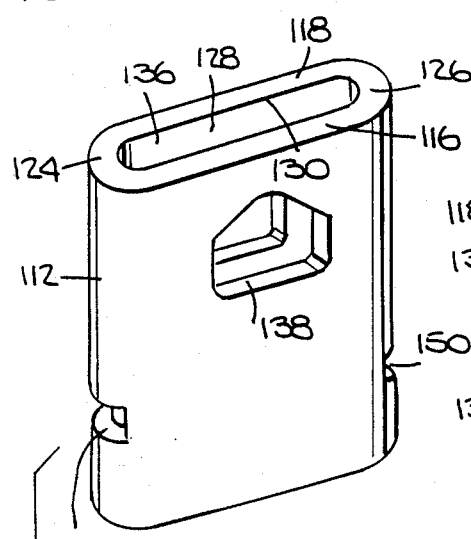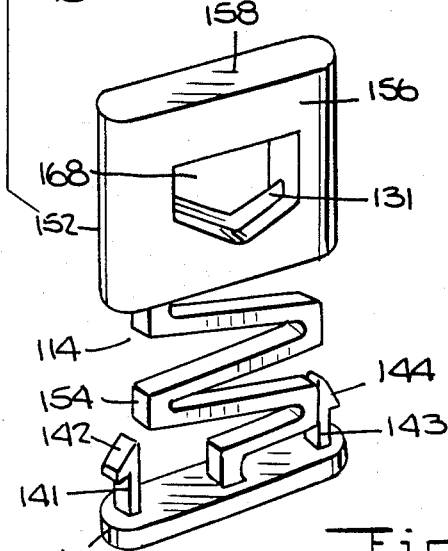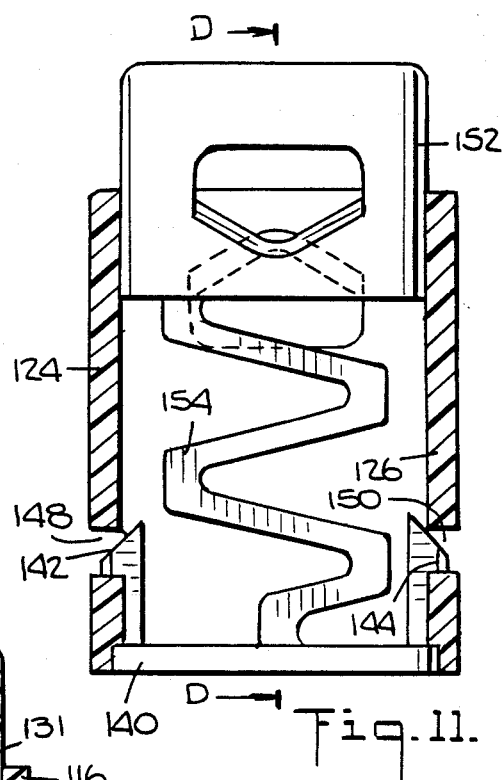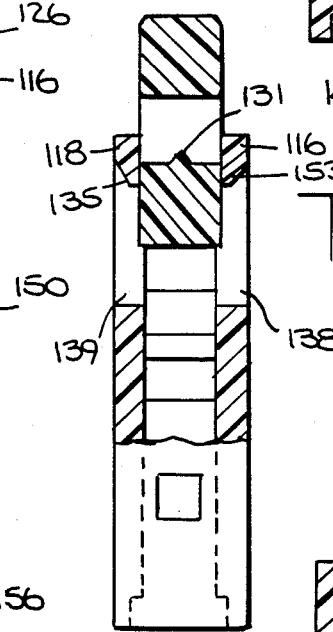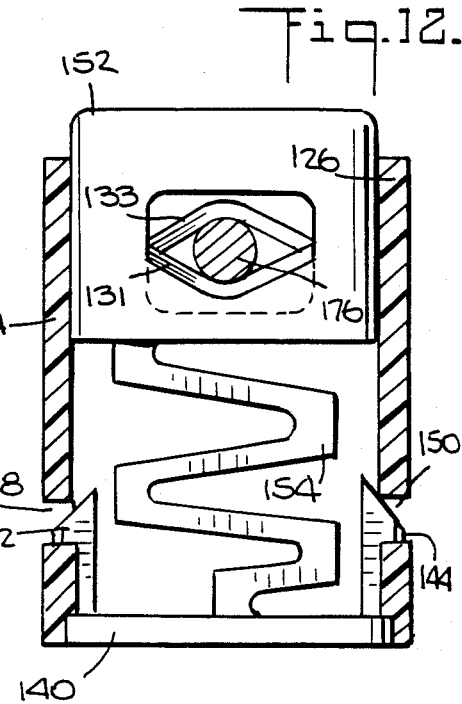

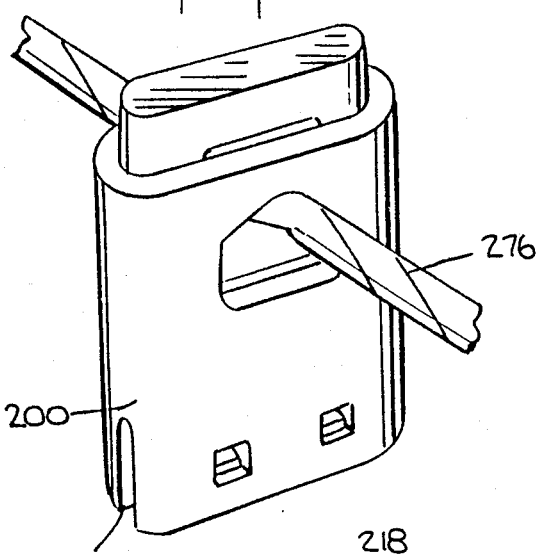
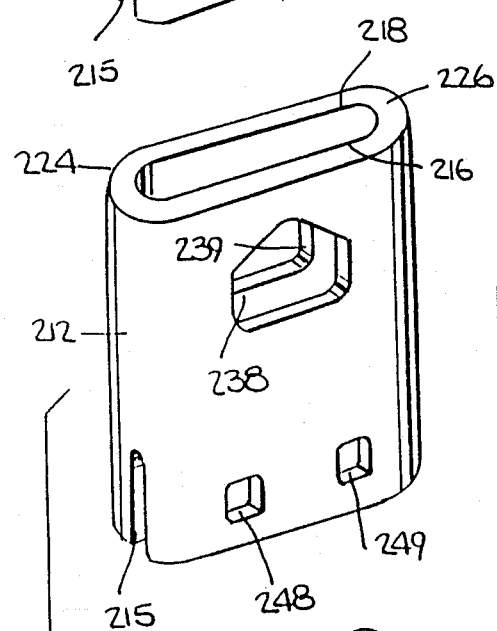
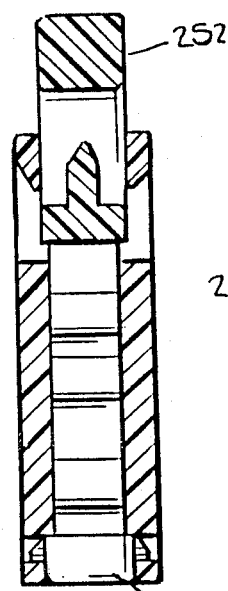
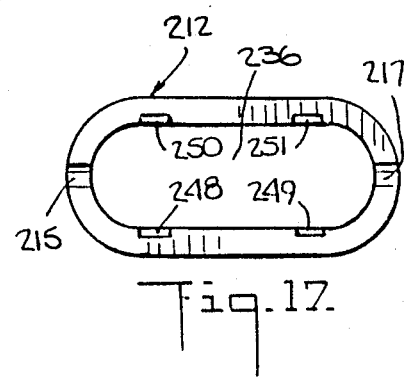
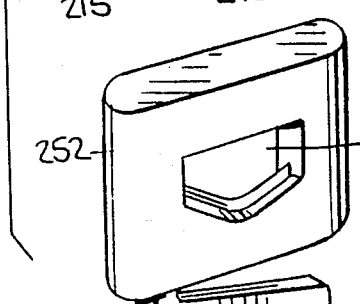
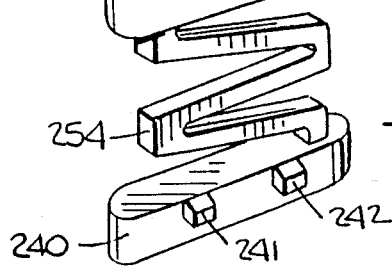

CORD FASTENER

This application is a continuation of application Ser. No. 905,831 filed Sept. 10, 1986, now abandoned.

FIELD OF THE INVENTION

This invention relates to a clamp or fastener for releasably engaging one or more cord elements to restrict the cord elements movement with respect to the fastener and/or each other and, more specifically, such devices which are of a two-piece snap-fit type construction and that include a spring biasing means for maintaining the device in a locked condition.

BACKGROUND OF THE INVENTION

Various devices for clamping or securing cords, i.e., cord fasteners, are well known, for example, U.S. Pat. No. 3,132,390 discloses a plastic slide clamp suitable for fastening a draw string in a bathing suit or the like. The patented device comprises a housing having a lock element slidably disposed in a tapering cavity in said housing. The interior surfaces of the cavity and the lock element define a passage through which cord is threaded and in which the cord is clamped or wedged by manual movement of the lock element. The lock element is provided with projections which engage slots in the housing and hold the lock element therein.

U.S. Pat. No. 3,564,670 discloses a cord fastener having a lock element that comprises a clamping roller which is slidably engaged with and manually moveable in a tapering cavity disposed in a housing. The roller is retained in the cavity with a movable pin and slot arrangement.

U.S. Pat. Nos. 3,845,575 and 3,965,544 disclose cord fasteners having a manually movable lock element slidably engaged with and disposed in a tapering cavity in a housing. The fastener disclosed in the latter patent is provided with resilient arms having a spring action that urges the lock element into the locked position.

U.S. Pat. Nos. 4,156,574 and 4,328,605 disclose cord fasteners provided with spring means for biasing a lock element into a locked position. The device disclosed in U.S. Pat. No. 4,156,574 employs arms which act as feelers and urge the lock element into the locked position at all times. Similarly, the device disclosed in U.S. Pat. No. 4,328,605 employs a helical spring which biases the lock element into the locked position.

The above-described devices especially those including means for urging the locking element into the locked position, are of rather complicated construction and do not provide a simple, reliable, device that automatically locks and that can be inexpensively constructed and easily assembled.

In view of the foregoing state of the art it would be desirable to provide a reliable automatically locking cord fastener of simple, inexpensive construction and that more fully realizes the objects and advantages sought to be provided by the prior art.

The fasteners of the present invention are useful in various applications where it is desired to releasably clamp a cord element in a selected position such as a drawstring closure and they are particularly useful in connection with sporting goods, such as, backpacks or sleeping bags, outerwear, such as, hooded parkas, rainwear and the like.

SUMMARY AND OBJECTS OF THE INVENTION

It is an object of the present invention to provide a cord fastener that can be easily constructed and assembled from two separate integrally formed parts.

It is another object of the present invention to provide a quick release cord fastener and that tightly engages cord elements with both a wedging and spring action that resists unintended loosening from vibration, heavy loads or the like.

It is another object of the present invention to provide a fastener device that securely binds a cord element or drawstring in a selected position and that can be easily released with one hand.

It is yet another object of the present invention to provide a cord fastening device that can be easily and inexpensively manufactured.

The present invention provides a two-piece cord fastener or clamp which comprises a housing which defines a cavity and a locking element disposed in the cavity. The locking element comprises a stationary segment which is fixedly engaged with said housing and a movable segment connected to said stationary segment by a spring means. A cord passage is defined by opposing surfaces of the movable segment and the cavity. The spring means constantly urges the movable segment into the locked position, i.e., so that the opposing surfaces converge and restrict the cord passage.

A cord disposed in said passage is securely gripped or clamped between the opposing surfaces when they converge and preferably one or more of the opposing surfaces may be provided with serations or angularly disposed knife-edges to enhance the grip of the opposing surfaces on the cord.

In one embodiment there are two cord passages and the cavity and movable segment are tapered so that the longitudinal axes of the passages converge on a central axis of the fastener housing so that increasing load on cords clamped in the passages causes the movable segment to be drawn into the cavity increasing the wedging action between the opposing surfaces to prevent slippage of the cords, as shown in FIG. 5 and hereinafter described in detail. This embodiment is preferably provided with a handle means for manually releasing the force of the spring means to enlarge the cord passages and thus release cord clamped therein.

The spring means is integrally molded with the stationary and movable segments and is preferably a multiple cantilever beam spring although other spring configurations may be possible.

Another embodiment employs a single cord passage (see FIG. 9) defined by two openings in the housing which may be transversely aligned with a conduit passing through the movable segment by compressing the spring means. It has been found advantageous to provide the opposing surfaces defining the single cord passage with V-shaped knife edges that can restrict the cord passage in more than one direction when the opposing surfaces of the movable segment and cavity are urged into the locked position by the springs means. Bi-directional restriction of the single cord passage and gripping action of the knife edges on the cord provide a reliable, tight, and slip-free clamping of the cord in the passage. To achieve maximum clamping action the V-shaped surfaces should define an included angle of less than about 120°. It will be seen that the cord passage in the single passage embodiment extends through the conduit formed in the movable segment and openings in walls of the housing transversely to the cavity. The knife edges are disposed on the sidewalls of each of the openings and on the interior surface of the conduit.

It is to be understood that all edges, including knife-edges will be suitably radiused or flattened to avoid unnecessary abrasion of the cord and adjacent moving surfaces, as well as, to prevent injury to persons using the fasteners.

Engagement of the stationary segment of the locking element with the housing is preferably achieved by snap-engagement members, e.g., protrusions having cammed surfaces and corresponding depressions on opposing surfaces of the stationary segment in the cavity or resilient arms provided with snap-engagement members. Of course, engagement could also be achieved by gluing, welding or the like. The term "cord" is used herein generally to refer to any cord, string, rope, thread or similar elongate flexible material which may be woven, braided, twisted or otherwise shaped to have a circular cross-section although, as will be appreciated by those skilled in the art, alternative shapes such as flat belts may also be employed.

BRIEF DESCRIPTION OF THE DRAWINGS

The above and other objects and features of the invention will be better understood from the following detailed description and explanation of typical embodiments of the invention illustrated in the accompanying drawings in which:

FIG. 1 is a front elevational view of a cord fastener constructed in accordance with the invention;

FIG. 2 is a side view of the housing of the fastener of FIG. 1 partially sectioned along line A—A to show the snap-engagement means in more detail;

FIG. 3 is a sectional view of the fastener of FIG. 1 taken along line B—B;

FIG. 4 is a central sectional view taken through the fastener of FIG. 1 showing the locking element disposed in the cavity of the housing;

FIG. 5 is a central sectional view similar to FIG. 4 further showing cords clamped in the passages defined by opposing surfaces of the cavity and the movable segment of the locking element;

FIG. 6 is a front elevation view of the housing and locking element of the fastener of FIG. 1 prior to assembly;

FIG. 7 is a sectional side view of the housing and locking element as shown in FIG. 6;

FIG. 8 is a partial sectional view of the housing and locking element of FIG. 7 assembled;

FIG. 9 is a front elevational view of a single passage type cord fastener constructed in accordance with the present invention;

FIG. 10 is a front perspective view of the cord fastener of FIG. 9 prior to assembly;

FIG. 11 is a partial sectional view of the cord fastener of FIG. 9 taken along line C—C without the cord;

FIG. 12 is a partial sectional view of the cord fastener of FIG. 9 showing a cord clamped therein;

FIG. 13 is a sectional side view of FIG. 11 taken along line D—D illustrating the cooperating knife-edges in the cord passage;

FIGS. 14 to 17 illustrate an alternative embodiment of the single passage cord fastener shown in FIG. 9 having a modified snap engagement means.

DESCRIPTION OF THE PREFERRED EMBODIMENTS

The two passage cord fastener or clamp 10 embodiment illustrated in FIGS. 1 to 8 includes housing 12 and locking element 14. The housing 12 and locking element 14 are integrally molded by techniques well known in the art, e.g. injection molding, and made from resilient plastic material such as polyethylene, polypropylene, polyamides, or acetal resins. Preferred resilient plastic materials are DELRIN TM available from DuPont Corp. and CELCON TM available from Celanese Corp.

The housing 12 shown in FIG. 1 is symmetrical and comprises two essentially flat circular front and rear walls 16 and 18 the latter being more clearly shown in FIG. 3. The walls 16 and 18 are joined along at least two portions of their periphery by lateral members 24 and 26. The interior surfaces 28 and 30 of walls 16 and 18 are essentially parallel to each other and interior surfaces 32 and 34 of lateral members 24 and 26 are essentially perpendicular to surfaces 28 and 30 thus defining a cavity 36 which extends through the entire housing 12. The cavity is generally configured to receive locking element 14 as hereinafter described. Portions of the lateral members interior surfaces 32 and 34 converge toward the central axis of the cavity 36 as they approach an opening 38 at one end of said cavity 36 thus forming a taper.

The locking element 14 comprises a stationary segment 40 connected to a movable segment 52 by a spring means 54. The stationary segment 40 is configured to fit snugly within one end of cavity 36 and is provided with a pair of cylindrical protrusions 42 and 44, extending outwardly from the front surface 46 thereof for close fitting engagement with a similarly shaped corresponding pair of depressions 48 and 50 disposed on the interior surface 28 of front wall 16 and may extend therethrough as best seen in FIGS. 2 and 3. The outward ends of protrusions 42 and 44 are cammed to facilitate 'snap-fit' engagement of protrusions 42 and 44 with depressions 48 and 50 and to ease assembly of fastener 10 by insertion of stationary segment 40 into cavity 36. The stationary segment 40 does not move with respect to the housing 12 after the fastener 10 is so assembled.

The spring means 54 in this embodiment is a cantilever spring which comprises two or more beams arranged in a zig-zag configuration. The details of suitable spring design and construction are available in trade literature available from DuPont Corp., Celanese Corp. and elsewhere. The spring means 54 extends outwardly from stationary member 40 into cavity 36 where it urges movable segment 52 into the locked position.

The movable segment 52 has front and rear surfaces 56 and 58 respectively, which are sustantially parallel to each other and to interior surfaces 28 and 30. A handle means 60 extends outwardly from front surface 56 through a slot 62 in front wall 16 providing means for moving the movable segment 52 within cavity 36 against the biasing or urging force of spring means 54. The rear surface 58 of movable segment 52 is provided with a ridge 72 that engages and slides in channel or guide groove 74 on interior surface 30 to guide the movable segment 52 so that it moves smoothly in a well defined path along the longitudinal axis of cavity 36.

The lateral surfaces 64 and 66 oppose and are substantially parallel to interior surfaces 32 and 34 forming converging or tapering cord passages 68 and 70. It can be seen that portions of the surfaces defining the cord passages are provided with serrations or teeth 31 for more securely clamping cord therebetween. The spring means 54 urges the movable segment 52 into the locked position so that it restricts the cord passages 68 and 70.

To assemble the cord fastener 10 the longitudinal axes of housing 12 and locking element 14 are coaligned as shown in FIGS. 6 and 7. The locking element 14 is then inserted into the cavity 36 of housing 12 and stationary segment 40 is forced into snap-fit engagement with housing 12 via corresponding protrusions 42, 44 and depressions 48, 50 as seen in FIG. 8. Thus the movable segment 14 is slidably engaged in cavity 36 with handle 60 extending from slot 62.

To use the cord fastener 10 cord 76 is threaded through the cavity 36 around locking element 14, as shown in FIG. 5, so that the cord is securely clamped in cord passages 68 and 70 by movable segment 52. The biasing force of spring means 54 holds movable segment 52 against the cord 76 maintaining the cord fastener 10 in the locked condition. The cord 76 is released by moving the handle 60 in slot 62 toward stationary segment 40. This movement of movable segment 52 relative to the housing 12 enlarges the cord passages 68 and 70 and thus releases cord 76 therefrom.

The cord fastener embodiments illustrated in FIGS. 9 to 17 each include a housing and locking element essentially as hereinabove described in connection with FIG. 1.

The cord fastener or clamp 100 shown in FIG. 9 differs from that shown in FIG. 1 in that it has a single cord passage. More particularly, cord fastener 100 is comprised of a housing 112 and a locking element 114 better seen in FIG. 10.

The housing 112 is symmetrical and has a flattened tube-like shape which provides two major surfaces which define a front wall 116 and a rear wall 118. The walls 116 and 118 are joined along adjacent ends by curved sections 124 and 126. The interior surfaces of walls 116 and 118 and members 124 and 126 define a cavity 136 which extends thru the entire housing 112 and is generally configured to receive locking element 114 as hereinafter described. A first opening 138 is provided in the front wall 116 and a second opening 139 is provided in opposing relation to the first opening 138 in rear wall 118.

The openings 138 and 139 are of similar shape and opposing portions of the upper periphery of each opening has an inverted V-like shape. The V-shape defines an included angle of less than about 120°. The V-shaped portions of openings 138 and 139 are tapered to form a pair of knife-edges 133 and 135.

The locking element 114 comprises a stationary segment 140 connected to a movable segment 152 by a spring means 154. The stationary segment 140 is configured to fit snugly within one end of cavity 136 and is provided with a pair of elongate 'dog-ears' 141 and 143. The dog-ears extend longitudinally and in the same direction as spring means 154 from the stationary segment 140. A pair of substantially triangular protrusions 142 and 144 project from the distal ends of dog-ears 141 and 143 respectively for close fitting engagement with a corresponding pair of depressions 148 and 150 disposed on the interior surfaces of curved sections 124 and 126. The outward ends of protrusions 142 and 144 are cammed to facilitate snap-fit assembly of fastener 100. Upon assembly the stationary segment 140 does not move with respect to the housing 112.

The spring means 154 is a cantilever spring which extends outwardly from stationary segment 140 in the direction of dog-ears 141 and 143 and into cavity where it urges movable segment 152 into the locked position.

The movable segment 152 has front and rear surfaces 156 and 158 which are substantially parallel to each other and to interior surfaces 128 and 130. A conduit 168, similar in shape and size to openings 138 and 139, extends between the surfaces 156 and 158 of movable segment 152. A portion of the lower interior of conduit 168 has a V-shape that defines an included angle of about 120° and is provided with a knife edge 131. The conduit 168 and openings 138 and 139 define a cord passage that traverses fastener 100 substantially perpendicular to the longitudinal axis thereof.

To assemble fastener 100 the longitudinal axis of housing 112 and locking element 114 are coaligned as shown in FIG. 10. The locking element 140 is then inserted into the cavity 136 of housing 112 and the stationary segment 140 is the forced into snap-fit engagement with housing 112 via protrusions 142 and 144 which are held in depressions 148 and 150 by resilient dog-ears 141 and 143. The completed fastener 100 with cord 176 passing therethrough is shown in FIG. 9 and in cross-section in FIG. 12.

To use the fastener 100 a cord 176 is threaded through the cord passage defined by the conduit 168 and openings 138 and 139. It will be noted that when the cord passage is empty spring means 154 positions the movable segment 152 so that the knife-edge 131 in conduit 168 extends beyond the opening 138 and 139 and the cord passage is restricted or occluded as shown in FIG. 11.

When spring means 154 is compressed, e.g., by squeezing the fastener 100 between the thumb and index finger of one hand the conduit 168 and openings 138 and 139 may be coaligned so that cord 176 is easily threaded through the cord passage. Finally, when the compressive force on fastener 100 is released the movable segment 152 is urged away from stationary segment 140 restricting the cord passage and firmly gripping or clamping the cord 176 therein as shown in FIG. 12. The V-shaped knife edges are cooperatively disposed in opposing directions so that the cord passage is restricted in both the vertical and horizontal directions when the opposing surfaces of the housing 112 and movable segment 152 defined thereby coverage. This bi-directional restriction of the cord passage increases the contact area between the cord 176 and knife edges 131, 133 and 135 increasing the gripping action of fastener 100 on cord 176. The gripping action is further enhanced by the knife edges which bite into the cord 176 without causing abrasion. The cord 176 is easily released from the grip of fastener 100 by pressing the movable segment 152 against the force spring 154 so that the conduit 168 and openings 138 and 139 are moved toward coalignment as in the threading operating described above.

The cord fastener 200 embodiment, shown in FIGS. 14 to 17, has substantially the same structure as the fastener 100 shown in FIG. 9 and described in the preceeding paragraphs. The cord fastener 200 has an integrally formed housing 212 and separate locking element 214. Movable segment 252, spring means 254, openings 238 and 239, conduit 268 and cooperating surfaces are configured operate in the same manner as described above thus providing a restricted cord passage for releasably gripping cord 276. However, the means for engaging the stationary segment 240 with housing 212 is substantially different.

In fastener 200 the means for achieving snap-fit engagement of the housing 212 and stationary segment 240 is two pairs of protrusions designated 241, 242 and 243, 244 (the latter pair not shown in the drawings) symmetrically arranged on opposing sides of stationary segment 240. Two pairs of corresponding depressions designated 248, 249 and 250, 251 are provided on the interior of major surfaces 216 and 218 for snugly engaging the protrusions 241 and 244 to securing the stationary segment 240 in cavity 236. The outward surfaces of protrusions 241 to 244 are suitably cammed to facilitate insertion of stationary segment 240 into snap-fit engagement with housing 212 which is further provided a pair of slots 215 and 217 in the curved sections 224 and 226 at the lower end of housing 212 and in the vicinity of depressions 248 to 251. The slots 215 and 217 provide flexing of the lower end of housing 212 which facilitates insertion of the cammed protrusions 241 to 244 into depressions 248 to 251.

The fastener 200 is otherwise assembled and operated in the manner described above in connection with fastener 100 shown in FIG. 9.

Although the present invention has been described in specific and detailed terms with respect to the preferred embodiments as set forth above, various other embodiments of this invention including alterations in size, shape, etc., substitutions of conventional elements and other applications will be readily apparent to those with ordinary skills in the art.

What is claimed is:

1. A cord-fastener which comprises:
   a housing having a cavity extending therethrough;
   a locking element disposed in said cavity;
   said locking element comprising a stationary segment fixedly engaged within said housing by resiliently separable fastener means comprising congruently shaped protrusions and holes cooperatively disposed on surfaces of said stationary segment and said cavity and a movable segment connected to said stationary segment by a spring means;
   a cord passage defined by opposing surfaces of said cavity and said movable segment; and
   said spring means urging said movable segment so that said opposing surfaces restrict said passage wherein said movable segment, stationary segment and spring means are integrally molded as one piece.

2. The fastener recited in claim 1 further comprising: handle means connected to said movable segment for moving said movable segment so that said passage is enlarged.

3. The fastener recited in claim 2 wherein said housing is an integrally molded part.

4. The fastener recited in claim 1 wherein said resiliently separable fastener means comprises two or more arms extending outwardly from said stationary segment into said cavity and a protrusion having a cammed surface extending from each arm into a corresponding hole in said cavity.

5. The fastener recited in claim 1 wherein said resiliently separable fastener means comprises a pair of clasps extending from said stationary segment into said clarity and protrusions extending from said clasps for engaging corresponding holes in said housing.

6. The fastener recited in claim 1 wherein the spring means is a multiple cantilever beam spring.

7. The fastener recited in claim 1 further including a slot in said housing and a handle means extending from the movable segment through said slot.

8. A cord fastener which comprises:
   a housing having a cavity extending therethrough;
   a locking element disposed in said cavity;
   said locking element comprising a stationary segment fixedly engaged with said housing by resiliently separable fastener means comprising congruently shaped protrusions and holes cooperatively disposed on surfaces on said stationary segment and said cavity, and a movable segment connected to said stationary segment by a spring means:
   a pair of cord passages defined by opposing surfaces of said cavity and said movable segment; and
   said spring means urging said movable segment so that said opposing surfaces restrict said passages.

9. The fastener recited in claim 8 wheren the cord passages converge about a central axis passing through said cavity and at least a portion of said opposing surfaces are serrated.

10. The fastener recited in claim 9 further including a slot in said housing and a handle means extending from the movable segment through said slot.

11. The fastener recited in claim 9 further comprising:
    handle means connected to said movable segment for moving said movable segment thereby enlarging said passages.

12. The fastener recited in claim 11, wherein said housing is an integrally molded part and said locking element is a separate integrally molded part.

13. A cord fastener which comprises:
    a housing having a cavity extending therethrough;
    a locking element disposed in said cavity;
    said locking element comprising a stationary segment fixedly engaged with said housing by resiliently separable fastener means comprising congruently shaped protrusions and holes cooperatively disposed on surfaces of said stationary segment and said cavity, and a movable segment connected to said stationary segment by a spring means;
    a cord passage passing transversely through said housing and defined by opposing surfaces of said housing and said movable segment; and
    said spring means urging said moveable segment so that said opposing surfaces restrict said passage wherein said movable segment, stationary segment and spring means are integrally molded as one piece.

14. The fastener recited in claim 13 further comprising V-shaped knife edges disposed on said opposing surfaces.

15. The fastener recited in claim 14 wherein the V-shaped knife edges define an included angle of less than about 120°.

16. The fastener recited in claim 14 wherein the included angle is about 120°.

17. The fastener recited in claim 13 wherein said housing is an integrally molded part.

18. The fastener recited in claim 13 wherein each said protrusion has a cammed surface extending outwardly from said stationary segment into a corresponding hole in said cavity.

19. The fastener recited in claim 13 wherein said resiliently separable fastener means comprises a pair of clasps extending from said stationary segment into said cavity and each having one of said protrusions.

20. The fastener recited in claim 13 wherein the spring means is a multiple cantilever beam spring.

* * * * *